United States Patent [19]

Itoh

[11] Patent Number: 4,916,602
[45] Date of Patent: Apr. 10, 1990

[54] MICROCODE CONTROL SYSTEM IN A MICROCOMPUTER CAPABLE OF BRANCHING TO DIFFERENT MICROCODE ROUTINES

[75] Inventor: Sakae Itoh, Hyogo, Japan

[73] Assignee: Mitsubishi Denki Kabushiki Kaisha, Tokyo, Japan

[21] Appl. No.: 97,250

[22] Filed: Sep. 16, 1987

[30] Foreign Application Priority Data

Sep. 20, 1986 [JP] Japan .................. 61-222768

[51] Int. Cl.⁴ .................. G06F 3/00; G06F 9/22
[52] U.S. Cl. .................. 364/200; 364/231; 364/231.6; 364/243; 364/261.3
[58] Field of Search ... 364/200 MS File, 900 MS File

[56] References Cited

U.S. PATENT DOCUMENTS

| | | | |
|---|---|---|---|
| 4,374,416 | 2/1983 | Catiller et al. | 364/200 |
| 4,374,418 | 2/1983 | Catiller et al. | 364/200 |
| 4,420,819 | 12/1983 | Price et al. | 364/900 |
| 4,580,216 | 4/1986 | Bellay et al. | 364/200 |
| 4,651,275 | 3/1987 | McDonough | 364/200 |
| 4,736,291 | 4/1988 | Jennings et al. | 364/200 |

Primary Examiner—Raulfe B. Zache
Assistant Examiner—Glenn Richman
Attorney, Agent, or Firm—Townsend & Townsend

[57] ABSTRACT

A method and apparatus for fast branching of microcode sequences in a microcomputer. A branch controller provides addresses to a microcode memory and receives addresses and a branch control signal back from the memory for the next microcode to be executed. Prior to determining whether a branch instruction is present at the indicated location in the sequence, the branch controller provides a provisional address to the memory for the next sequential microcode in the sequence assuming that no branching is to occur. Then a determination is made whether a branch instruction is present. If so, the provisional address is changed by inverting one or more address bits to reflect the branching address and the changed address is applied within the same cycle to the memory.

5 Claims, 5 Drawing Sheets

PRIOR ART

MICROCODE CONTROL SYSTEM IN A MICROCOMPUTER CAPABLE OF BRANCHING TO DIFFERENT MICROCODE ROUTINES

BACKGROUND OF THE INVENTION

1. Field of the Invention

The present invention relates to a microcomputer operable under microcode control, and more particularly to a microcomputer capable of branching to different microcode routines among instructions without causing any delay in branch timing.

2. Description of the Prior Art

Figure 4:
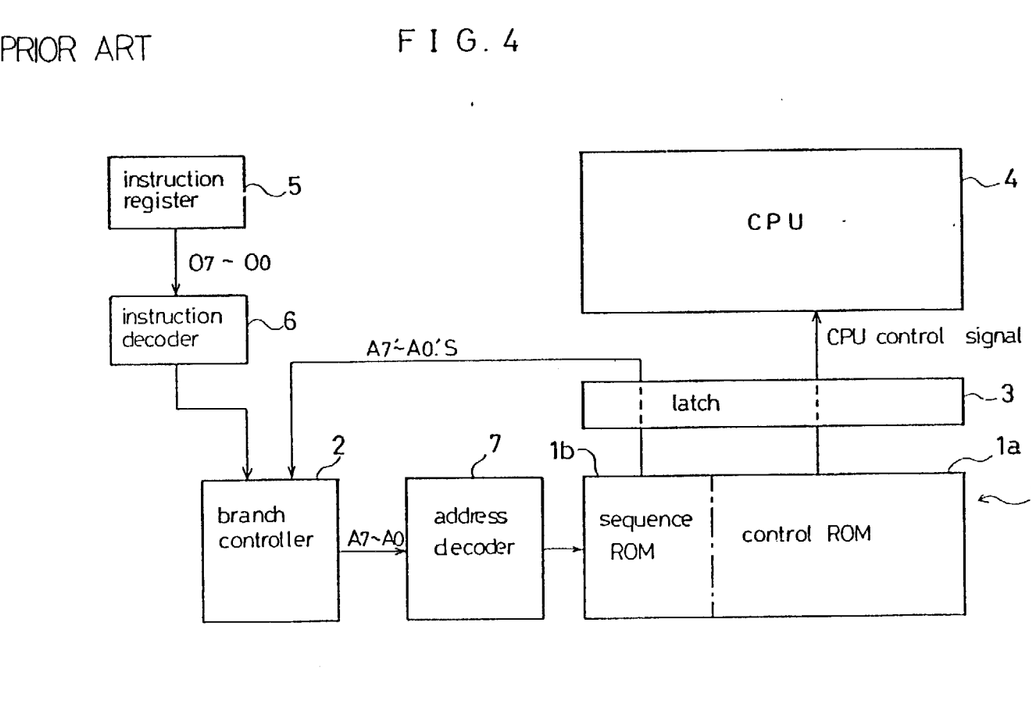
FIG. 4 is a circuit block diagram of a prior art microcomputer under microcode control.

FIG. 4 is a block diagram illustrating a typical arrangement of a microcomputer operable under microcode control.

As shown in the figure, a ROM 1 (memory) composed of a control ROM1 $a$ and a sequence ROM 1$b$ stores microcode. A branch controller 2 issues an 8 bit address signal $A_0$ to $A_7$, i.e., an addressing bit signal for specifying the address of each microcode stored in the ROM 1. The control ROM 1$a$ and the sequence ROM 1$b$ issue signals in one to one correspondence to those addresses for executing those designated microcodes. The control ROM 1$a$ stores CPU control information and delivers that information to a CPU 4 through a latch 3, thereby permitting the CPU to execute the predetermined operation. In addition, the sequence ROM 1$b$ transmits back to the branch controller 2 an address signal $A_7'$ to $A_0'$ for the next microcode to be executed in succession and a branch control signal S.

Instruction register 5 provides an 8 bit instruction code $O_7$ to $O_0$ to an instruction decoder 6. The instruction decoder 6 decodes the instruction code $O_7$ to $O_0$. In succession, the decoded signal is sent to the branch controller 2, which in turn sends the address of the first microcode required for the execution of that instruction to the ROM 1 through an address decoder 7. The instructions thereafter are executed by permitting the microcode itself to indicate its address to be executed in succession by the sequence ROM.

Figure 5:
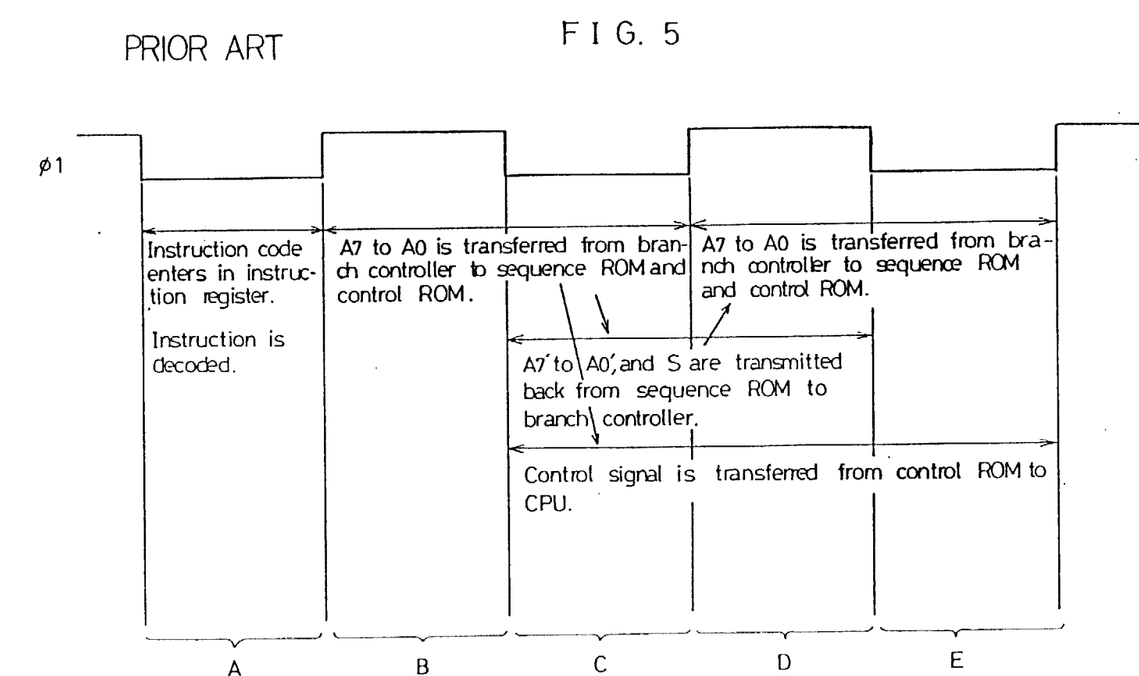
FIG. 5 is a timing chart illustrating operation of the microcomputer of FIG. 4.

In what follows, operation of the microcomputer of FIG. 4 will be described with reference to FIG. 5 which illustrates a timing chart for the microcomputer. Designated here at $\Phi_1$ is a reference clock for the microcomputer. With the end of the instructions being executed, the next instructions are fetched, and the instruction code $O_7$ to $O_0$ is entered in the instruction register in a period A, in which the clock is low, $\Phi_1=$"L". The instruction code $O_7$ to $O_0$ is decoded in the same period A, and the decoded signal is transmitted to the branch controller 2. The branch controller 2, which receives the decoded signal, determines the address $A_7$ to $A_0$ of the first microcode for executing this instruction, and transfers the address signal $A_7$ to $A_0$ to the ROM 1 in one clock cycle (periods B and C in FIG. 5) beginning when the clock is high $\Phi_1=$"H". The control ROM 1$a$ then transmits a control signal to the CPU4 through the latch 3 during periods C, D, and E for causing the CPU4 to execute the operation corresponding to the microcode. In the meanwhile, the sequence ROM1$b$ transmits the address signal $A_7'$ to $A_0'$ of the next microcode to be executed in succession along with a branch control signal S back to the branch controller 2 during the periods C and D. The branch controller S decodes these signals $A_7'$ to $A_0'$ and S, and transmits the address of the next microcode to be executed in succession to the ROM 1 during the periods D and E. As this sequence is repeated, one instruction is executed over several cycles.

Figure 6:
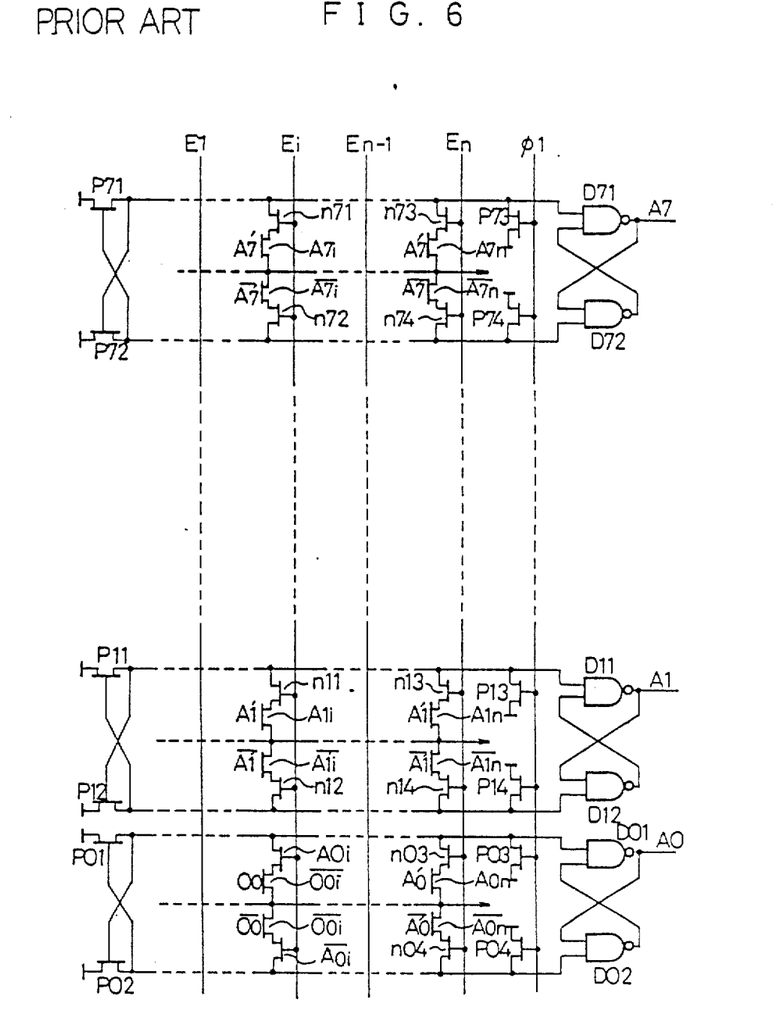
FIG. 6 is a circuit diagram illustrating a prior art branch controller.

How an execution sequence of the microcode is branched will now be described. FIG. 6 illustrates part of the branch controller 2. The reference symbols P71, P72, P73, P74 . . . , P01, P02, P03, and P04 designate P channel MOS transistor. The reference symbols $A_{7i}$, $A_{7i}$, . . . , $A_{7n}$, $A_{7n}$, . . . , $A_{0n}$, $A_{0n}$ designate n channel MOS transistors, to the gates of which are respectively applied to address signals $A_7'$, $A_7' \sim A_0'$, $A_0'$ from the sequence ROM 1$b$. The reference symbols $n_{71}$, $n_{72}$, $n_{73}$, $n_{74}$, . . . , $n_{03}$, $n_{04}$ designate n channel MOS transistors, which are respectively switched on by branch control signals $E_1$ to $E_n$. The address signal $A_7'$ to $A_0'$ and the branch control signal S are decoded in the period C of $\Phi_1=$"L" in the timing chart shown in FIG. 5. When the associated execution sequence is not branched, the signal $E_n$ in the circuit diagram of FIG. 6 changes to "H" in the period D of $\Phi_1=$"H". This permits $A_7'$ to $A_0'$ to be transferred as they are to $A_7$ to $A_0$ as the address of the next microcode. On the other hand, when the execution sequence is branched, one of the decoder signals $E_1 E_{n-1}$ of the branch control signal S changes to "H" in the period D. For example, once the signal $E_i$ changes to "H", the execution sequence is branched to any of $A_7'$ to $A_1'$ a microcode and $A_7'$ to $A_1'$ at the address $O_0$, and a microcode at an address $O_0$, by the least significant bit $O_0$ of the instruction code.

Figure 7A:
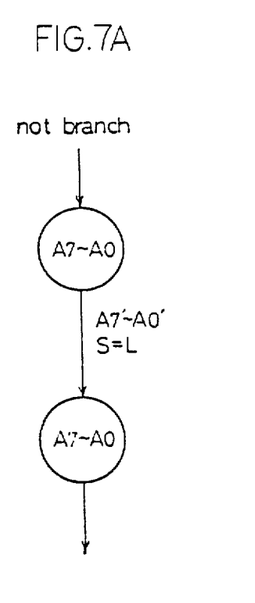
FIG. 7A is a high-level flow diagram illustrating the address signal in the branch controller of FIG. 6 when no branching is indicated.
Figure 7B:
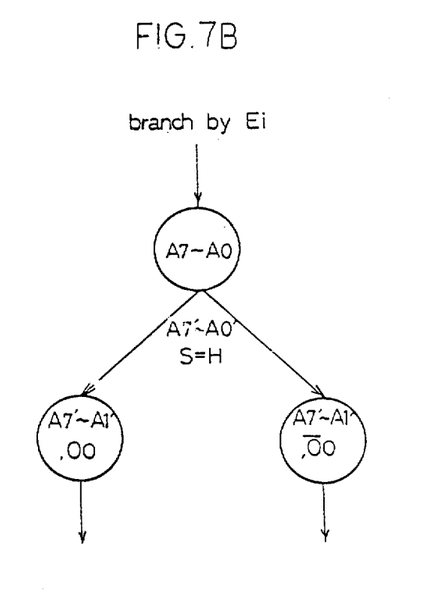
FIG. 7B is a high-level flow diagram illustrating the address signal branch sequence in the branch controller of FIG. 6 when branching is present.

FIG. 7 simply illustrates this situation. The advantage of such use of the branch is to save on the capacities of the control ROM and the sequence ROM by permitting various different instructions or different operands of the same instructions to own jointly a common microcode in the execution sequence thereof and branch when they encounter any non-common microcode.

However, such a branch system of the microcode in prior microcomputers suffers from the following problems: As shown in the timing chart of FIG. 5, information for the branch must be securely determined in the period of $\Phi_1=$"L", and the timing for the branch must be delayed by one cycle provided the information is determined in the period D of $\Phi_1=$"H". Accordingly, any additional required microcode will be delayed correspondingly. Furthermore, provided the timing for the branch is delayed by one cycle, any circuit to detect that delay necessarily results in a more complicated branch controller.

SUMMARY OF THE INVENTION

In view of the drawbacks of the prior art, it is an object of the present invention to provide a microcomputer capable of simplifying the circuit for controlling a conditional branch in an instruction execution sequence and making that circuit operate at a high speed so as to shorten the time required for execution of instructions as well as to reduce the chip area of the ROM chip which stores the microcode.

To achieve the above object, a microcomputer according to the present invention includes a branch controller providing a provisional address to the microcode memory, which address assumes that no branch is indicated. Then, the branch information is incorporated into the provisional address (if branching is indicated) by changing the provisional address as needed. The change is made in such a manner that the address signal settles rapidly and may be provided to the microcode memory sufficiently quickly to significantly reduce the time required for the branching operation.

In more detail, the microcomputer of the present invention provides a bit signal for addressing the microcode memory prior to issuance of a branch control signal. The branch control signal is used for inverting any bit in the aforementioned settled bit signal as needed to convey the branching address.

The above and other objects, features, and advantages of the invention will become more apparent from the following description when taken in conjunction with the accompanying drawings.

DESCRIPTION OF THE PREFERRED EMBODIMENT

An embodiment of a microcomputer of the present invention now be described with reference to the accompanying drawings.

Figure 1:
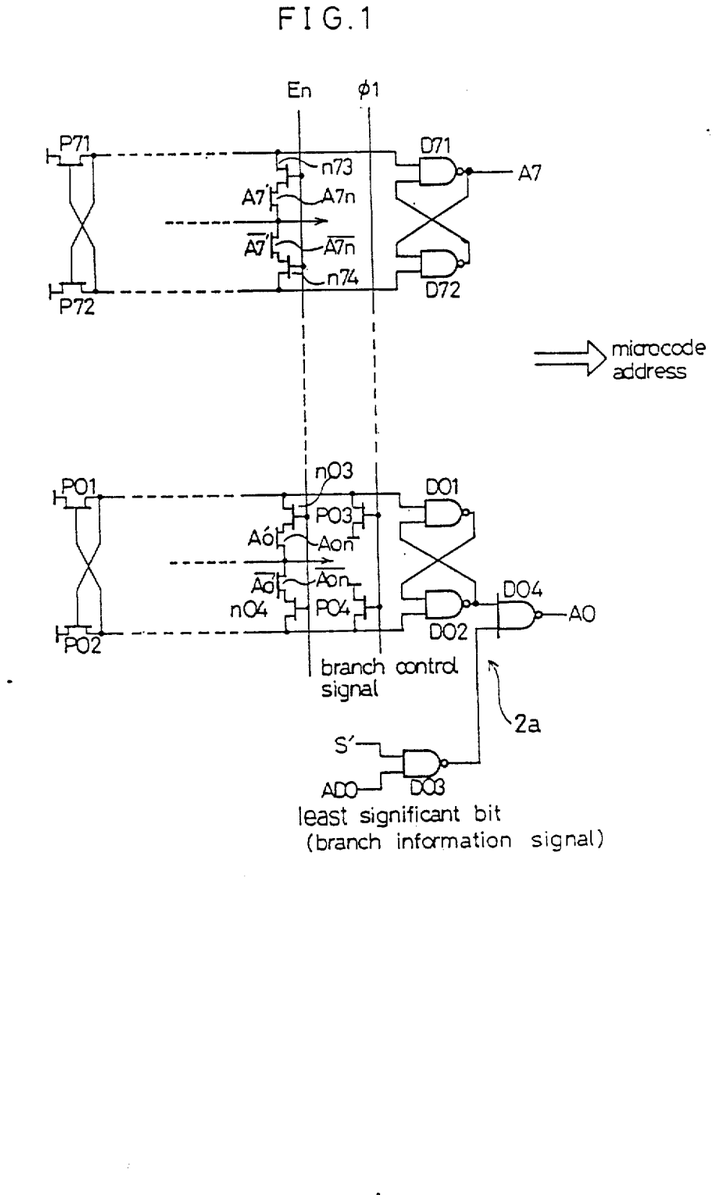
FIG. 1 is a circuit block diagram illustrating an embodiment of a branch controller of a control unit in a microcomputer according to the present invention.

FIG. 1 illustrates a branch controller in a control unit of the embodiment of a microcomputer according to the present invention. In FIG. 1, the same reference symbols are used as in FIG. 6 to designate corresponding elements. Moreover, designated at $D_{03}$ and $D_{04}$ are NAND gates additionally provided in the present embodiment, which constitute branch information incorporation means $2a$.

The present embodiment only differs from the prior circuit of FIG. 6 in an output part of the address $A_0$. The symbol S' refers to a branch control signal returned from the sequence ROM, which is the branch control signal instructing a branch process according to the present invention to be executed when $\Phi_1 =$ "H". The symbol AD0 designates the least significant bit of the associated address.

The embodiment of the present invention will be described below in the example of the branch control produced in a read/write operation with respect to any data in a microcomputer having a data bus width of 16 bits. For example, a situation will be described wherein 1 word (2 bytes) of data is read from the memory at a certain address, and instructions for the control to operate on that data are executed.

Figure 2:
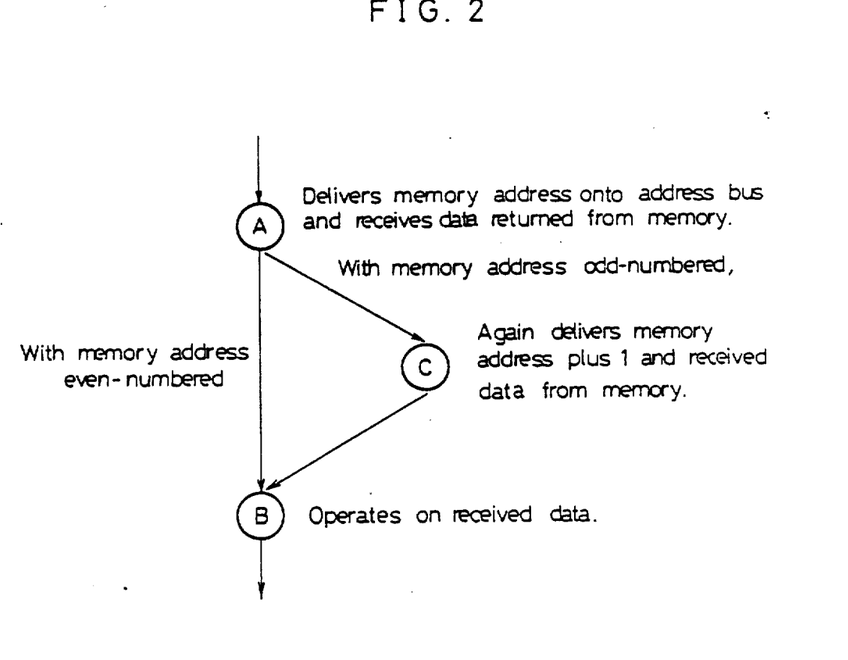
FIG. 2 is a high-level flow diagram illustrating a branch sequence of microcode in the embodiment of FIG. 1.

The first microcode instructs the CPU to execute the operation of fetching a memory address onto an address bus by a control signal from the control ROM. This permits the contents of the memory at that address to be read. Meanwhile, the sequence ROM returns to the branch controller 2 the address signal $A_7'$ to $A_0'$ of a microcode to be executed in sequence. When the memory address placed onto the address bus is even-numbered, data of one word can be fetched in this one cycle, and accordingly the microcode to be executed in succession instructs the CPU to execute the operation on that data. In the contrary case when the address in the memory is odd-numbered, only one byte can be fetched in view of the configuration of the memory, and accordingly the microcode to be executed in succession must instruct an operation by which the first memory address plus 1 are again fetched and the remaining one byte is fetched. The, the execution sequence can then operate on the associated data. FIG. 2 illustrates the sequence described above.

The microcode has to branch in a manner depending on whether the memory address leading to the associated data is even-numbered or odd-numbered, i.e., whether the least significant bit AD0 (see FIG. 1) on the address bus is "L" or "H". This branching is however not always satisfactory in the prior art. The reason is that the prior art method must delay, as described previously, the branch timing by one cycle unless the information for the branch has been fully determined and settled previously to the period D. By contrast, the present embodiment can execute such a branch without any delay by making use of a signal, which rises relatively rapidly after the reference clock $\Phi_1$ from the microcomputer rises in the period D. This is illustrated with reference to the timing chart of FIG. 3.

Figure 3:
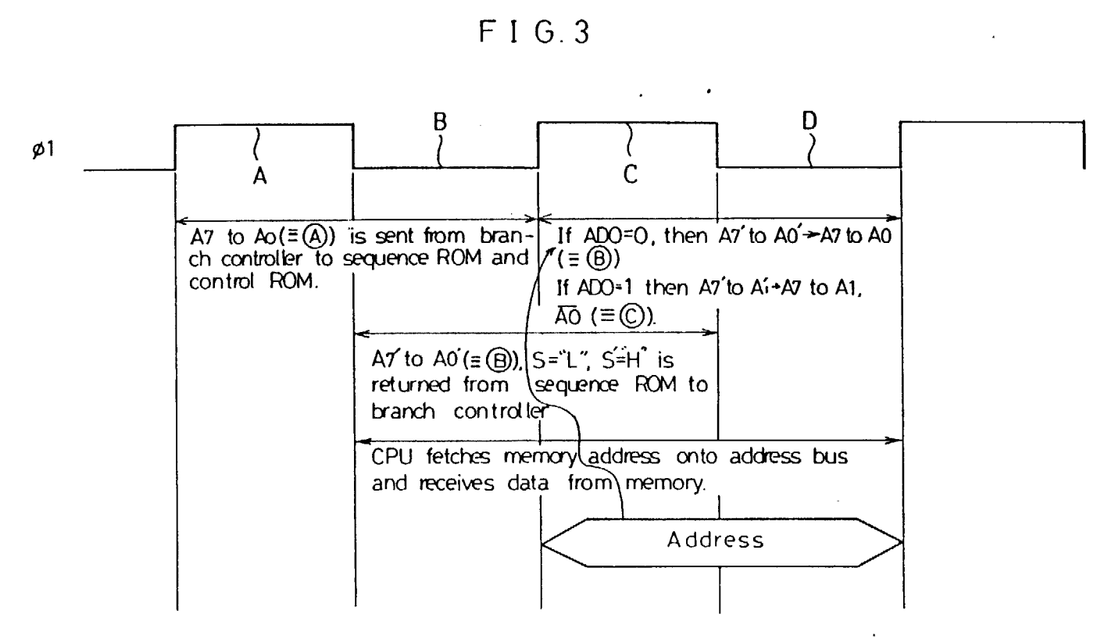
FIG. 3 is a timing chart of the branch sequence of FIG. 2.

The microcode indicated by an address Ⓐ sends a memory address onto an address bus in the periods B, C, and D, and receives data from the memory. Meanwhile, $A_7'$ to $A_0'$ from the sequence ROM 1b and the branch control signal S, after the branch control signal has been made "H" for instructing a branch are returned to the branch controller 2. As the branch controller is receiving those signals, it decodes the signals during the period B, when $\Phi_1 =$ "L", and determines whether the next microcode is Ⓑ or Ⓒ. The branch controller transmits the result as the signal $A_7$ to $A_0$ in the periods C and D. However, the delivery of the memory address by the microcode of the address Ⓐ onto the address bus is done after the rise of $\Phi_1$ in the period C. Accordingly, the address delivery will not generally be in time for the branch decision. To solve this difficulty, the branch controller shown in FIG. 1 is employed.

That is, $A_7'$ to $A_0'$ returned from the sequence ROM 1b by the microcode of the address Ⓐ is previously set to indicate the address of Ⓑ. $A_0' = 0$ is here assumed. In other words, the address of Ⓑ is pre-assumed to be even-numbered. And, no branch is instructed in the prior method where S is taken as low, S = "L". Instead of this, the other branch control signal S' is returned after it is made high. Thereupon, $E_n =$ "H" is attained, because no branch in the prior method has been instructed, to result in the address $A_7$ to $A_0$ indicative of Ⓑ being delivered from the rise of $\Phi_1$ in the period C. However, since S' = H' has been attained, a memory address delivered onto the address bus in the same timing gets odd-numbered, i.e., $A_0$ is forcedly made "H" upon AD0 = "H". (when AD0 = "L", $A_0 =$ "L" as described previously.) Assignment of the microcode of Ⓒ to this address assures this execution sequence.

According to the present embodiment, as described above, the additional function is provided, which is capable of incorporating part of an address signal settled at the instant of the rise of a control clock from the microcomputer to thereby control whether or not the least significant bit of the address $A_7$ to $A_0$ of the microcomputer is inverted. Accordingly, no delay of the branch is produced, and this effectively speeds up the instruction execution. In addition, no circuit to detect the delay of the branch is required, and this simplifies the branch controller. Moreover, no microcode is required for delaying the branch when the branch information is not yet settled, and this reduces the chip area of the ROM in which microcodes are stored.

Furthermore, in the embodiment described above, there was described the method of controlling a branch produced when one word of data is read in the microcomputer, which has a data bus width of 16 bits. The use of this control principle enables any signal, if it is settled in a relatively early stage after the rise of $\Phi_1$, to be employed as the branch information, and assures the same effect as that of the present embodiment.

According to the microcomputer of the present invention, as described above, even a signal settled in a relatively early stage of the instant a branch should be done can be employed for the branch information. It is therefore not necessary to delay the branch timing by one cycle, whereby execution of instructions can be made at a higher speed together with a reduction of the number of microcodes, further speeding up instruction execution.

What is claimed is:

1. Apparatus for use in a microcomputer operable under microcode control for controlling the branching of microcode sequences, said microcomputer including a memory for storing microcode and a branch controller responsive to a clock signal for issuing an address signal to said memory for specifying the address of microcode to be executed, said memory providing a branch control signal to said branch controller indicating the presence or absence of branch instructions in said microcode sequences, said apparatus being characterized in that:

said branch controller is structured and arranged to provide a provisional address to said memory in a first clock period for the next sequential code in a microcode sequence assuming no branch is indicated, said address being provided prior to determining the presence of a branch instruction;

said branch controller includes branch information incorporation means for incorporating branch information into said provisional address, said incorporation means being structured and arranged to change the provisionally provided address, in a subsequent clock period, to reflect the address of the next microcode in a branched sequence whenever said branch control signal indicates a branch instruction is present; and said branch control means provides said changed address to said memory in said same subsequent clock period.

2. The apparatus of claim 1 wherein said address signal is an addressing bit signal and said branch information incorporation means is further characterized by logic means for inverting one or more bits of said addressing bit signal to indicate the address of the next microcode in the branched sequence.

3. A method of controlling the branching of microcode sequences in a microcomputer under microcode control, said microcomputer including a memory for storing microcode and a branch controller for issuing an address signal to said memory for specifying the address of microcode to be executed, said method comprising the steps of:

in a first clock period, provisionally providing to said memory the next sequential address in a microcode sequence assuming no branch is indicated said address being provided prior to determining the presence of a branch instruction;

in a subsequent clock period, changing the provisionally provided address, if a branch instruction is determined to be present responsive to a branch control signal, to indicate the address of the next microcode in the branched sequence, and in said same subsequent clock period providing said changed address for said memory.

4. The method of claim 3 wherein said address signal is an addressing bit signal and said provisionally provided address is changed by inverting one or more bits thereof to indicate the address of the next microcode in the branched sequence.

5. The method of claim 4 wherein said provisionally provided address is changed by inverting only the least significant bit thereof responsive to said branch control signal.

* * * * *